D. Mills,
Blind Stop.
N° 37,300. Patented Jan. 6, 1863.
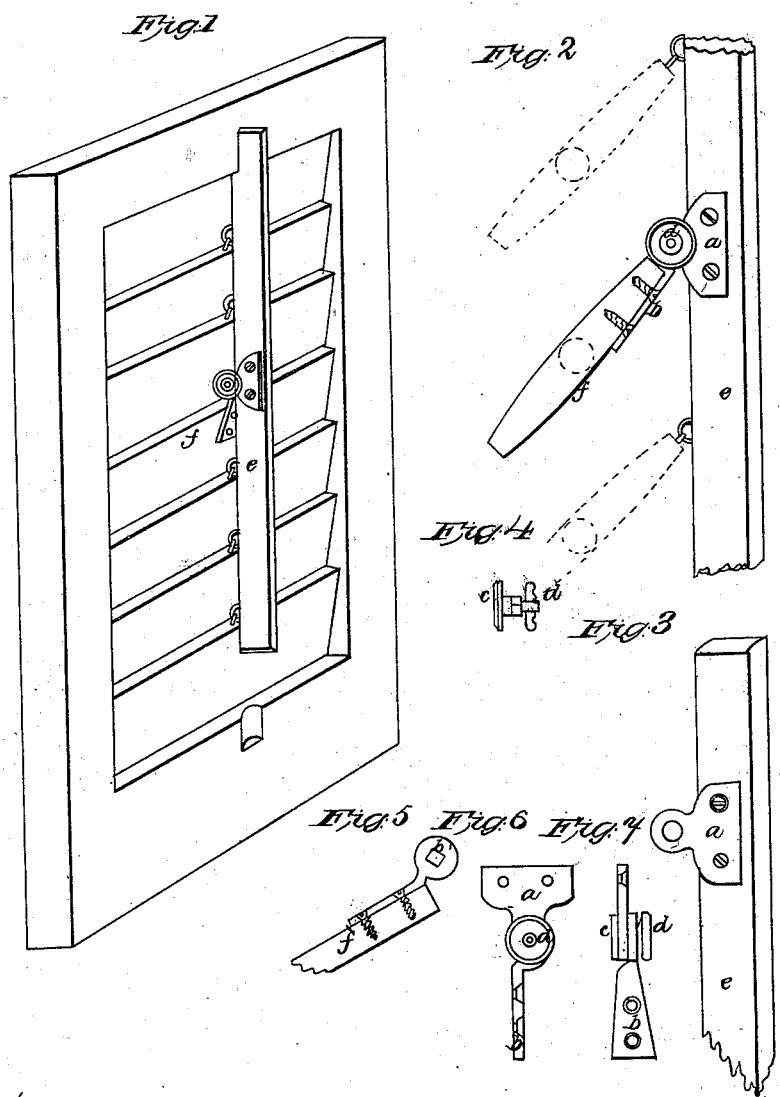
Witnesses:
Lawrence Holmes Jr
Thomas Carter
Inventor:
Daniel Mills

UNITED STATES PATENT OFFICE.

DANIEL MILLS, OF PATERSON, NEW JERSEY.

IMPROVEMENT IN WINDOW-BLIND FASTENINGS.

Specification forming part of Letters Patent No. 37,300, dated January 6, 1863.

*To all whom it may concern:*

Be it known that I, DANIEL MILLS, of Paterson, in the county of Passaic, in the State of New Jersey, have invented a new and Improved Mode of Fastenings for Window-Blinds; and I do hereby declare that the following is a full and exact description thereof, reference being had to the accompanying drawings, and to the letters of reference marked thereon, in which—

Figure I is a perspective view of a blind with the fastening attached. Fig. II is a section of a full-sized slat and connecting-bar, showing the manner in which the fastening is applied and the mode of its operation. Fig. III represents the part of the fastening which is applied to the connecting-bar. Fig. IV represents the pin or bolt (in connection with the nut) which binds the joint together. By referring to the drawings it will be seen that the stem near the head of the bolt or pin $c$ is round for a distance equaling the thickness of the half-joint $a$, which is attached to the connecting-bar $e$. The central portion of the stem is square, fitting the half-joint $b$ in Fig. V. The remaining portion of the stem terminates in a screw corresponding to the mill-edged nut $d$, making in all a bolt or pin binding the portions $a$ and $b$ together, and forming a joint which may be stiffened or relaxed, and by which means the blinds may be set at any angle or kept entirely closed, in order to keep out the wind or light, as desired. Fig. V is that half of the joint which is applied to the slat $f$. Fig. VI is a top view of the fastening, showing the pin or bolt $c$ and the mill-edged nut $d$, binding the joint. Fig. VII is a side view of the fastening, showing the mill-edged nut $d$, with the screw end of the pin or bolt $c$.

The nature of my invention consists in the peculiar construction of a fastening for window-blinds by which the blinds may be set at any angle to exclude or admit, as desired, the wind or light. As blinds are at present made the pivots on the ends of the slats are allowed to touch the bottoms of the sockets, so as to produce friction sufficient to hold the slats in any position, but these in time wear loose.

By the use of my fastening the blinds are prevented from falling open by the weight of the staples and connecting-bar $e$ by simply turning by hand the mill-edged nut $d$, so as to bind the joint, thus holding the slats in any desired position, and dispensing with the necessity of giving stiffness to the pivots. This binding of the joint by screwing up the milled nut on the bolt $c$ need not take place except at long intervals, as when tightened once it does not require to be again moved until made loose by wear. The pin or bolt $c$, being formed with a square shank in the portion entering the half-joint $b$, is prevented from turning in its socket or in the nut. These forms obviate the risk of working the nut off or loose by the motion of the connecting-bar $e$ when adjusting the blind-slats $f$, and they also prevent the pin from turning around when the joint is being tightened by turning the milled nut by hand. The portion of the pin or bolt being round next the head, and that portion of it entering the other half-joint, which has a corresponding round aperture or socket, a free or restrained motion of the joint or hinge is obtained in proportion to the pressure applied by the mill-edged nut $d$.

Having described the nature and operation of my invention and the manner of its construction and application to window-blind slats as an adjustable fastening, what I claim as my invention, and desire to secure by Letters Patent, is—

The combination and arrangement of the adjustable hinged fastening $a$ $b$ $d$, with a window-blind, substantially as and for the purpose described.

DANL. MILLS.

Witnesses:
 LAWRENCE HOLMS, Jr.,
 LAWE HOLMS.